US012540642B2

(12) United States Patent
Ma et al.

(10) Patent No.: US 12,540,642 B2
(45) Date of Patent: Feb. 3, 2026

(54) ECCENTRIC SLIDER FOR CRANKSHAFT, SCROLL COMPRESSOR, AND TEMPERATURE CONTROL DEVICE

(71) Applicant: GUANGDONG MIDEA ENVIRONMENTAL TECHNOLOGIES CO., LTD., Guangdong (CN)

(72) Inventors: Yingchao Ma, Guangdong (CN); Jinhan Chen, Guangdong (CN)

(73) Assignee: GUANGDONG MIDEA ENVIRONMENTAL TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/243,811

(22) Filed: Sep. 8, 2023

(65) Prior Publication Data

US 2023/0417272 A1 Dec. 28, 2023

Related U.S. Application Data

(63) Continuation of application No. PCT/CN2023/093916, filed on May 12, 2023.

(30) Foreign Application Priority Data

Jun. 24, 2022 (CN) ........................ 202210721766.3

(51) Int. Cl.
*F16C 3/22* (2006.01)
*F04C 18/02* (2006.01)
(Continued)

(52) U.S. Cl.
CPC ............ *F16C 3/22* (2013.01); *F04C 18/0215* (2013.01); *F04C 29/0057* (2013.01); *F04C 29/028* (2013.01)

(58) Field of Classification Search
None
See application file for complete search history.

(56) References Cited

U.S. PATENT DOCUMENTS

| | | | |
|---|---|---|---|
| 5,011,384 | A | 4/1991 | Grunwald et al. |
| 6,354,822 | B1 | 3/2002 | Lifson et al. |

FOREIGN PATENT DOCUMENTS

| | | | |
|---|---|---|---|
| CN | 103502645 | A | 1/2014 |
| CN | 104047851 | A | 9/2014 |

(Continued)

OTHER PUBLICATIONS

USPTO Machine Translation (retrieved from FIT database) of CN 209586676 U, Wang et al., Nov. 5, 2019. (Year: 2025).*

(Continued)

*Primary Examiner* — Daniel D Yabut

(74) *Attorney, Agent, or Firm* — Scully, Scott, Murphy & Presser, P.C.

(57) ABSTRACT

An eccentric slider for a crankshaft, a scroll compressor, and a temperature control device are provided. The eccentric slider has a slider body. An assembly hole is formed in the slider body. The assembly hole allows insertion of an eccentric shaft segment of the crankshaft. An outer peripheral wall surface of the slider body has a bearing surface and a non-bearing surface opposite to the bearing surface. The bearing surface drives an orbiting scroll. A hollow portion is formed on the non-bearing surface. The hollow portion accommodates an oil.

15 Claims, 9 Drawing Sheets

(51) Int. Cl.
*F04C 29/00* (2006.01)
*F04C 29/02* (2006.01)

(56) References Cited

FOREIGN PATENT DOCUMENTS

| | | | |
|---|---|---|---|
| CN | 107208633 | | 9/2017 |
| CN | 107208633 | A | 9/2017 |
| CN | 209586676 | U | 11/2019 |
| CN | 114439747 | A | 5/2022 |
| CN | 114922817 | A | 8/2022 |
| JP | H11159484 | A | 6/1999 |
| JP | 2003286975 | A | 10/2003 |
| KR | 980008625 | U | 4/1998 |
| WO | WO 2012144067 | A1 | 10/2012 |
| WO | 2016170615 | A1 | 10/2016 |
| WO | 2021124424 | A1 | 6/2021 |

OTHER PUBLICATIONS

USPTO Machine Translation (retrieved from FIT database) of WO 2016170615 A1, Takai et al., Oct. 27, 2016. (Year: 2025).*

USPTO Machine Translation (retrieved from FIT database) of the Description of JP 2003286975 A, Yano et al., Oct. 10, 2003. (Year: 2025).*

Extended European search report dated Jul. 31, 2024 received in European Patent Application No. 23744353.6.

Decision of Granting Patent Right for Invention dated Jul. 11, 2024 received in Chinese Patent Application No. 202210721766.3.

First Office Action dated Aug. 18, 2023 received in Chinese Patent Application No. CN 202210721766.3.

International Search Report dated Aug. 19, 2023 received in International Application No. PCT/CN2023/093916.

Second Office Action dated Mar. 12, 2024 received in Chinese Patent Application No. CN 202210721766.3.

Written Opinion dated Aug. 19, 2023 received in International Application No. PCT/CN2023/093916.

Notice of Reasons for Refusal dated Oct. 8, 2024 received in Japanese Patent Application No. 2023-557419.

Notice of Reasons for Refusal dated Feb. 25, 2025 received in Japanese Patent Application No. 2023-557419.

Decision to Grant a Patent dated May 13, 2025 received in Japanese Patent Application No. 2023-557419.

Office Action dated Sep. 19, 2025 received in European Patent Application No. 23744353.6.

* cited by examiner

ECCENTRIC SLIDER FOR CRANKSHAFT, SCROLL COMPRESSOR, AND TEMPERATURE CONTROL DEVICE

CROSS-REFERENCE TO RELATED APPLICATIONS

The present application is a continuation application of International Application No. PCT/CN2023/093916, filed on May 12, 2023, which claims priority to Chinese Patent Application No. 202210721766.3, filed with China National Intellectual Property Administration on Jun. 24, 2022, the entire contents of each of which are incorporated herein by reference for all purposes. No new matter has been introduced.

FIELD

The present disclosure relates to the field of compressor design technologies, and more particularly, to an eccentric slider for a crankshaft, a scroll compressor, and a temperature control device.

BACKGROUND

A scroll compressor usually has an orbiting scroll and a static scroll that are used for compressing a working fluid. The orbiting scroll achieves orbital revolution and translation under drive of an eccentric shaft segment of a crankshaft, in such a manner that the orbiting scroll cooperates with the static scroll to compress the fluid. Generally, an eccentric slider is disposed between the eccentric shaft segment and the orbiting scroll and is radially adjustable. When the orbiting scroll is subject to a large load exerted by the compressed fluid (for example, if a large-particle fluid or even a liquid enters a compression cavity formed by a vortex sheet of the orbiting scroll and a vortex sheet of the static scroll, a radial load exerted by the large-particle fluid or the liquid on the vortex sheets changes significantly), the eccentric slider can generate a radial adjustment relative to the eccentric shaft segment to realize an unloading function, which reduces a probability that the vortex sheet of the orbiting scroll or a scroll wrap of the static scroll is damaged by the radial load, improving reliability of the scroll compressor.

However, during an operation of a conventional scroll compressor, a bearing surface of the eccentric slider and an inner side wall of the orbiting scroll are always in a compression state. Since a formed oil film transmits all the driving force required to overcome a compressed fluid between the orbiting scroll and the static scroll, a shear force on the oil film (i.e., an oil film shear force) warms up the oil film, which leads to high power consumption. In fact, in the process of the existing scroll compressor driving the orbiting scroll through the eccentric slider, the oil film is formed between a circumferential surface of the eccentric slider and a corresponding side wall of the orbiting scroll. That is, the oil film shear force exists between an axial surface of the eccentric slider and the corresponding side wall of the orbiting scroll, which is not conducive to performance and reliability of the scroll compressor.

SUMMARY

One embodiment of the present disclosure provides an eccentric slider for a crankshaft, a scroll compressor, and a temperature control device, aiming to reduce an oil film shear force between a circumferential surface of the eccentric slider and a corresponding side wall of an orbiting scroll.

To achieve the above embodiment, the embodiments of the present disclosure adopt the following technical solutions. An eccentric slider for a crankshaft is provided. The eccentric slider includes a slider body. An assembly hole is formed in the slider body. The assembly hole is configured to allow for an insertion of an eccentric shaft segment of the crankshaft. An outer peripheral wall surface of the slider body includes a bearing surface and a non-bearing surface opposite to the bearing surface. The bearing surface is configured to drive an orbiting scroll. A hollow portion is formed on the non-bearing surface. The hollow portion is configured to accommodate an oil.

In an embodiment, the non-bearing surface includes a hollow side surface. Two sides of the hollow side surface are respectively connected to two sides of the bearing surface. A distance from the hollow side surface to a central axis of the slider body is smaller than a distance from the bearing surface to the central axis of the slider body. The hollow side surface is formed as a side wall of the hollow portion.

In an embodiment, the non-bearing surface further includes a first transition side surface and a second transition side surface that are respectively connected to the two sides of the hollow side surface. A side of the first transition side surface facing away from the hollow side surface is connected to one of the two sides of the bearing surface. A side of the second transition side surface facing away from the hollow side surface is connected to another side of the two sides of the bearing surface. Each of a distance from the first transition side surface to the central axis of the slider body and a distance from the second transition side surface to the central axis of the slider body is greater than the distance from the hollow side surface to the central axis of the slider body and smaller than or equal to the distance from the bearing surface to the central axis of the slider body.

In an embodiment, the hollow portion is a through groove extending in an axial direction of the slider body.

In an embodiment, the hollow portion includes a plurality of through grooves extending in an axis direction of the slider body. Two adjacent through grooves of the plurality of through grooves are spaced apart from each other.

In an embodiment, a stop edge configured to avoid leakage of the oil is disposed at an end of the hollow portion facing away from the orbiting scroll.

In an embodiment, an angle formed between a plane passing through one of two sides of the hollow portion and the axis of the slider body and a plane passing through another side of the two sides of the hollow portion and the central axis of the slider body ranges from 60° to 120°.

In an embodiment, in a rotation direction of the eccentric shaft segment, a flow side surface is disposed in a rear region of the bearing surface and configured to allow for flowing of the oil in an extension direction of the central axis of the slider body.

According to another embodiment of the present disclosure, a scroll compressor is provided. The scroll compressor includes: a crankshaft provided with an eccentric shaft segment and an oil passage extending in an axial direction of the crankshaft, the oil passage penetrating the eccentric shaft segment; and an orbiting scroll provided with a mounting portion. The scroll compressor further includes the above-mentioned eccentric slider for the crankshaft. The eccentric shaft segment is inserted in the assembly hole. The slider body is mounted between the mounting portion and the eccentric shaft segment.

In an embodiment, the scroll compressor further includes an orbiting scroll bearing fixedly mounted in the mounting portion. The slider body is inserted in a bearing bore of the orbiting scroll bearing. An outer peripheral wall of the slider body is in a clearance fit with a bore wall of the bearing bore of the orbiting scroll bearing.

In an embodiment, a clearance H between an outer side wall of the eccentric slider and the bore wall of the bearing bore of the orbiting scroll bearing ranges from 0.1 mm to 0.6 mm.

In an embodiment, a clearance between a wall surface of the hollow portion and a corresponding portion of the bore wall of the bearing bore of the orbiting scroll bearing ranges from 0.2 mm to 0.6 mm.

According to one embodiment of the present disclosure, a temperature control device is provided. In some embodiments, the temperature control device includes the above-mentioned scroll compressor.

The embodiments of the present disclosure can at least provide the following advantageous effects.

The eccentric slider provided by the embodiments of the present disclosure is assembled in the scroll compressor. In this way, during start-up and operation of the scroll compressor, the crankshaft rotates, which enables the eccentric shaft segment to drive an axis of the eccentric slider to rotate around an axis of the crankshaft, allowing the bearing surface of the eccentric slider to compress a corresponding inner side wall of the orbiting scroll. Since an oil is stored between the bearing surface and the corresponding inner side wall of the orbiting scroll, the oil film is formed by compressing the oil, which enables part of the compressed oil to be forced to the hollow portion of the non-bearing surface. In addition, a large amount of oil presents between the hollow portion and a corresponding side wall of the orbiting scroll. Thus, a compression force generated by the sheared oil film between the hollow portion and the corresponding side wall of the orbiting scroll is reduced. That is, the oil film shear force between the hollow portion and the corresponding side wall of the orbiting scroll is reduced, which reduces the overall oil film shear force between the circumferential surface of the eccentric slider and the corresponding side wall of the orbiting scroll, thereby effectively improving performance and reliability of the scroll compressor.

BRIEF DESCRIPTION OF THE DRAWINGS

In order to clearly explain technical solutions of embodiments of the present disclosure, drawings used in the description of the embodiments or the related art are briefly described below. The drawings as described below are merely some embodiments of the present disclosure. Based on these drawings, other drawings can be obtained by those skilled in the art without creative effort.

REFERENCE NUMERALS OF THE ACCOMPANYING DRAWINGS

Figure 1:
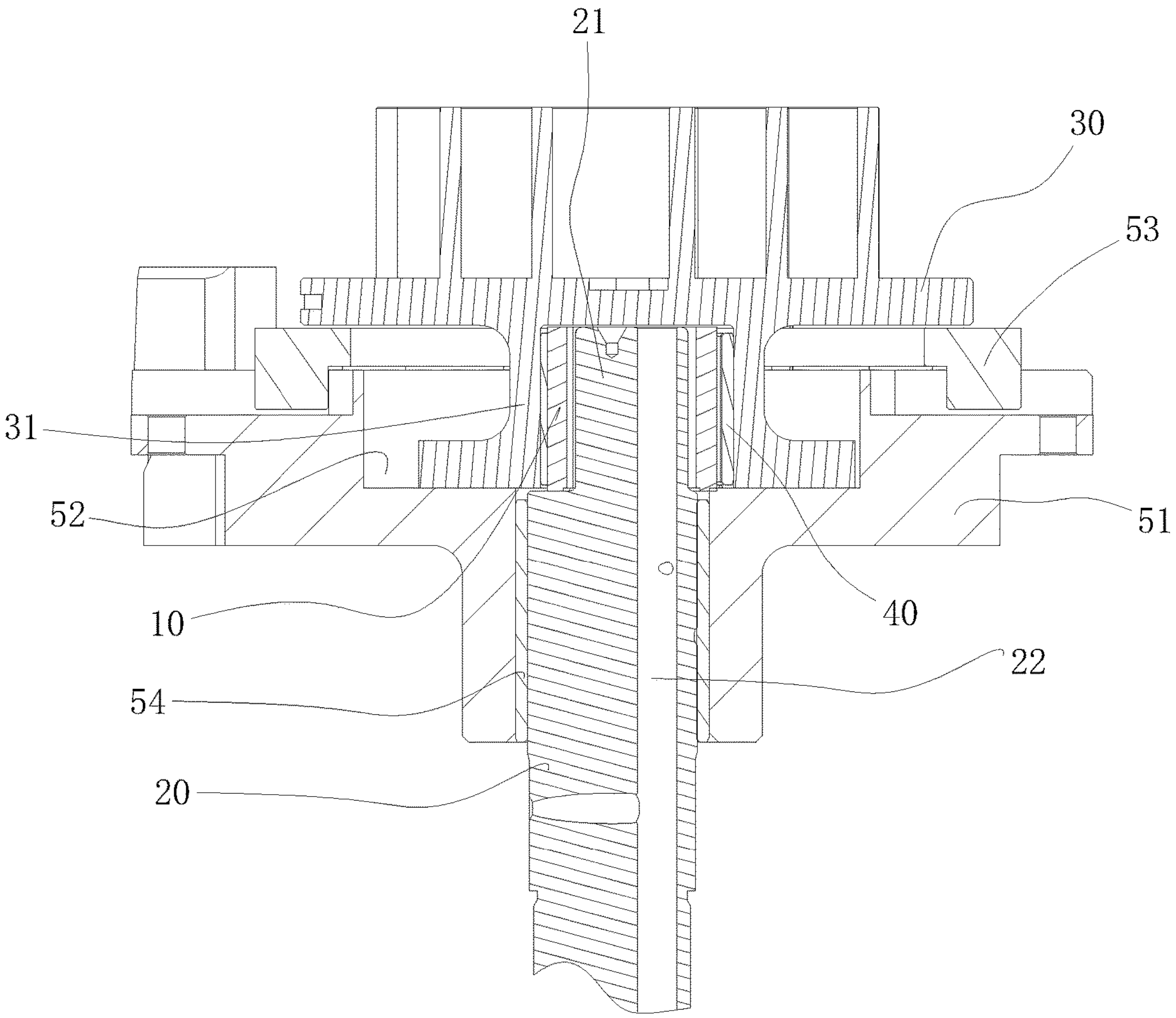
FIG. 1 is a sectional assembled view of a rack, a crankshaft, and an orbiting scroll according to an embodiment of the present disclosure.

10, slider body; 11, assembly hole; 12, bearing surface; 13, non-bearing surface; 131, first transition side surface; 132, second transition side surface; 14, hollow portion; 141, hollow side surface; 142, through groove; 143, through groove; 15, stop edge; 16, flow side surface;

20, crankshaft; 21, eccentric shaft segment; 22, oil passage;

30, orbiting scroll; 31, mounting portion;

40, orbiting scroll bearing;

51, rack; 52, oil storage cavity; 53, cross slip ring; 54, crankshaft bearing.

DETAILED DESCRIPTION OF EMBODIMENTS

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the embodiments of the present disclosure.

In the description of the embodiments of the present disclosure, it should be understood that the orientation or position relationship indicated by the terms “length”, “width”, “upper”, “lower”, “front”, “rear”, “left”, “right”, “vertical”, “horizontal”, “top”, “bottom”, “inner”, and “outer”, etc. is based on the orientation or position relationship shown in the drawings, and is only for the convenience of describing the embodiments of the present disclosure and simplifying the description, rather than indicating or implying that the pointed device or element must have an exemplary orientation, or be constructed and operated in an exemplary orientation, and therefore cannot be understood as a limitation of the embodiments of the present disclosure.

In addition, the terms “first” and “second” are only used for descriptive purposes, and cannot be understood as indicating or implying relative importance or implicitly indicating the number of indicated technical features. Therefore, features associated with “first” and “second” may explicitly or implicitly include at least one of the features. In the description of the embodiments of the present disclosure, “plurality” means at least two, unless otherwise exemplary defined.

In the embodiments of the present disclosure, unless otherwise clearly specified and limited, terms such as “install”, “connect”, “connect to”, “fix” and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those of ordinary skill in the art, the exemplary meaning of the above-mentioned terms in the embodiments of the present disclosure can be understood according to exemplary circumstances.

As illustrated in FIG. 1, the embodiments of the present disclosure provide a scroll compressor. The scroll compressor includes a rack 51, a cross slip ring 53, a crankshaft 20, a crankshaft bearing 54, an eccentric slider, an orbiting scroll 30, a static scroll (not illustrated), a housing (not illustrated), and so on. During assembly, an accommodation cavity is formed on the housing. The static scroll is fixedly assembled on the housing and located at a top of the accommodation cavity. The rack 51 is mounted in the accommodation cavity. The orbiting scroll 30 is disposed at a side of the rack 51 facing towards the static scroll. A vortex sheet of the orbiting scroll 30 and a vortex sheet of the static scroll engage with each other to form a compression cavity. The orbiting scroll 30 is movable relative to the rack 51. The cross slip ring 53 is movably connected to the rack 51. A movement of the orbiting scroll 30 relative to the rack 51 is limited and guided by the cross slip ring 53. The crankshaft 20 is rotatably assembled to the rack 51 through the crankshaft bearing 54. An eccentric shaft segment 21 is disposed on the crankshaft 20. A side of the orbiting scroll 30 facing away from the static scroll has a mounting portion 31. The eccentric shaft segment 21 is in a drive connection to the mounting portion 31 through the eccentric slider. After the assembly, an oil storage cavity 52 is formed when the rack 51 is covered by the orbiting scroll 30. An oil passage 22 extending in an axial direction of the crankshaft 20 is formed in the crankshaft 20 and penetrates the eccentric shaft segment 21. The oil passage 22 is in communication with the oil storage cavity 52 and is extended to an oil pool at a bottom of the housing. When a fluid in the compression cavity is compressed through a relative movement between the orbiting scroll 30 and the static scroll, oil is extracted from the oil pool through the oil passage 22 under the action of a centrifugal force generated by high-speed rotations of the crankshaft 20, flows down from a top end of the eccentric shaft segment 21, and enters between a circumferential surface of the eccentric slider and a corresponding side wall of the orbiting scroll. In addition, the oil may enter the oil storage cavity 52. The crankshaft bearing 54 and a position between an end surface of the mounting portion 31 of the orbiting scroll 30 and the rack 51 are lubricated with the oil in the oil storage cavity 52 to reduce wear and prolong a service life.

Figure 2:
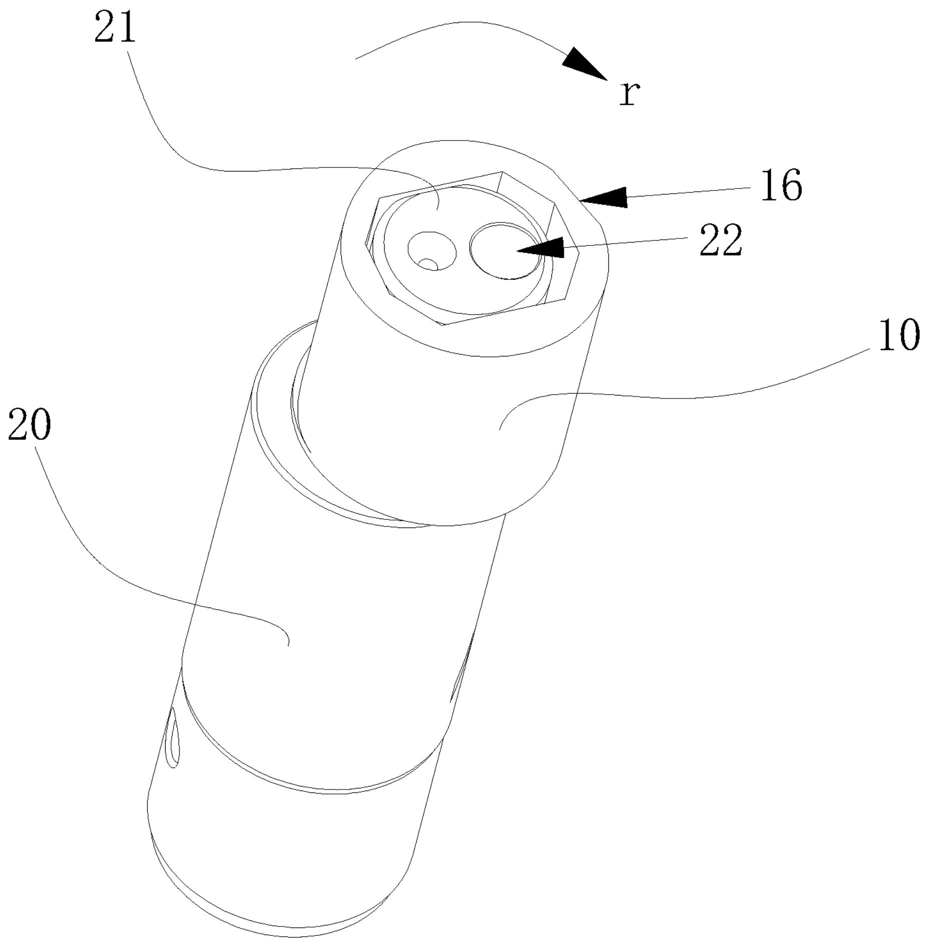
FIG. 2 is a schematic structural view of an eccentric slider mounted on a crankshaft according to an embodiment of the present disclosure, in which an arrow r indicates a rotation direction of the crankshaft.

To enable the eccentric shaft segment 21 of the crankshaft 20 to drive the orbiting scroll 30 more efficiently, the embodiments of the present disclosure provide an eccentric slider, as illustrated in FIG. 2. The eccentric slider is assembled on the eccentric shaft segment 21 and mounted between the mounting portion 31 and the eccentric shaft segment 21. That is, the eccentric slider includes a slider body 10. An assembly hole 11 is formed in the slider body 10 and penetrates both ends of slider body 10 along an axis of the slider body 10. The eccentric shaft segment 21 is inserted in the assembly hole 11. In addition, an outer peripheral wall surface of the slider body 10 includes a bearing surface 12 and a non-bearing surface 13 opposite to the bearing surface 12. The bearing surface 12 is configured to drive the orbiting scroll 30. A hollow portion 14 is formed on the non-bearing surface 13. That is, the hollow portion 14 corresponds to a space enclosed by a portion of the non-bearing surface 13 and a corresponding side wall of the orbiting scroll 30. The hollow portion 14 is configured to accommodate an oil compressed by the bearing surface 12 and the orbiting scroll 30 in a direction from the bearing surface 12 to the non-bearing surface 13.

The eccentric slider provided by the embodiments of the present disclosure is assembled in the scroll compressor. In this way, during start-up and operation of the scroll compressor, the crankshaft 20 rotates, which enables the eccentric shaft segment 21 to drive the axis of the slider body 10 to rotate around an axis of the crankshaft 20 (in a direction r illustrated in FIG. 2), allowing the bearing surface 12 of the slider body 10 to compress a corresponding inner side wall of the orbiting scroll 30. Since the oil is stored between the bearing surface 12 and the corresponding inner side wall of the orbiting scroll 30, an oil film is formed by compressing the oil, and part of the compressed oil is forced to the hollow portion 14 of the non-bearing surface 13. In addition, a large amount of oil presents between the hollow portion 14 and a corresponding side wall of the orbiting scroll 30. Thus, a compression force generated by the sheared oil film between the hollow portion 14 and the corresponding side wall of the orbiting scroll 30 is reduced. That is, shear force of the oil film between the hollow portion 14 and the corresponding side wall of the orbiting scroll 30 is reduced, which reduces the overall shear force of the oil film between the circumferential surface of the eccentric slider and the corresponding side wall of the orbiting scroll 30, thereby effectively improving performance and reliability of the scroll compressor.

In the embodiments of the present disclosure, the non-bearing surface 13 includes a hollow side surface 141. The hollow side surface 141 is formed as a side wall of the hollow portion 14. In some embodiments, two sides of the hollow side surface 141 are respectively connected to two sides of the bearing surface 12. A distance from the hollow side surface 141 to a central axis of the slider body 10 is smaller than a distance from the bearing surface 12 to the central axis of the slider body 10. That is, the hollow side surface 141 is obtained by performing a machining process (through shaping of a turning machine or through grinding and shaping) on a circumferential surface of the cylindrical slider body 10. Thus, when the slider body 10 is mounted in the mounting portion 31, a larger gap is formed between the hollow side surface 141 and the corresponding side wall of the orbiting scroll 30, which reduces a thickness of the oil film formed on the hollow side surface 141. That is, the shear force of the oil film is reduced, which reduces the overall shear force of the oil film between the circumferential surface of the eccentric slider and the corresponding side wall of the orbiting scroll 30, thereby effectively improving the performance and reliability of the scroll compressor.

Figure 4:
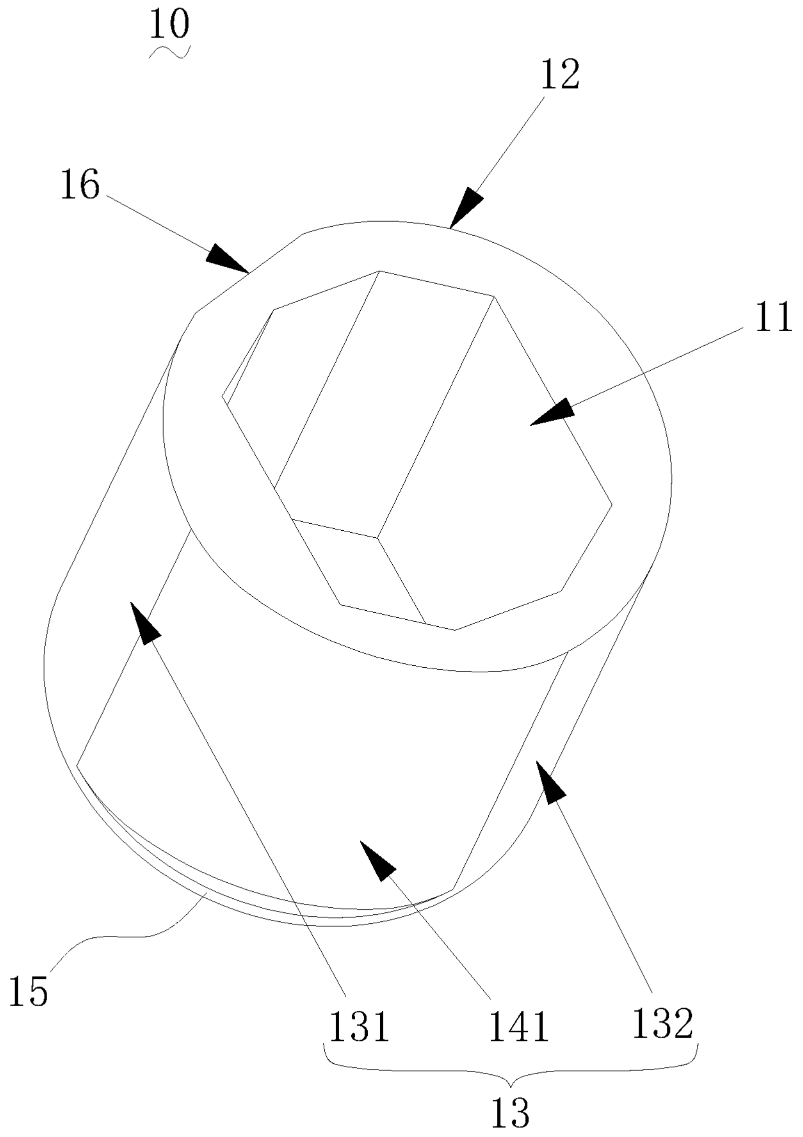
FIG. 4 is a schematic structural view of an embodiment of an eccentric slider of the present disclosure.

Further, as illustrated in FIG. 4, the non-bearing surface 13 further includes a first transition side surface 131 and a second transition side surface 132 that are respectively connected to the two sides of the hollow side surface 141. A side of the first transition side surface 131 facing away from the hollow side surface 141 is connected to one of the two sides of the bearing surface 12. A side of the second transition side surface 132 facing away from the hollow side surface 141 is connected to another side of the two sides of the bearing surface 12. The first transition side surface 131 and the second transition side surface 132 are formed as transitions between the bearing surface 12 and the hollow side surface 141, in such a manner that the bearing surface 12 is smoothly connected to the hollow side surface 141 to ensure a drive ability of the eccentric slider to the mounting portion 31. In the embodiments of the present disclosure, each of a distance from the first transition side surface 131 to the central axis of the slider body 10 and a distance from the second transition side surface 132 to the central axis of the slider body 10 is greater than the distance from the hollow side surface 141 to the central axis of the slider body 10 and smaller than or equal to the distance from the bearing surface to the central axis of the slider body 10. In some embodiments, each of the distance from the first transition side surface 131 to the central axis of the slider body 10 and the distance from the second transition side surface 132 to the central axis of the slider body 10 is smaller than the distance from the bearing surface to the central axis of the slider body 10.

Figure 5:
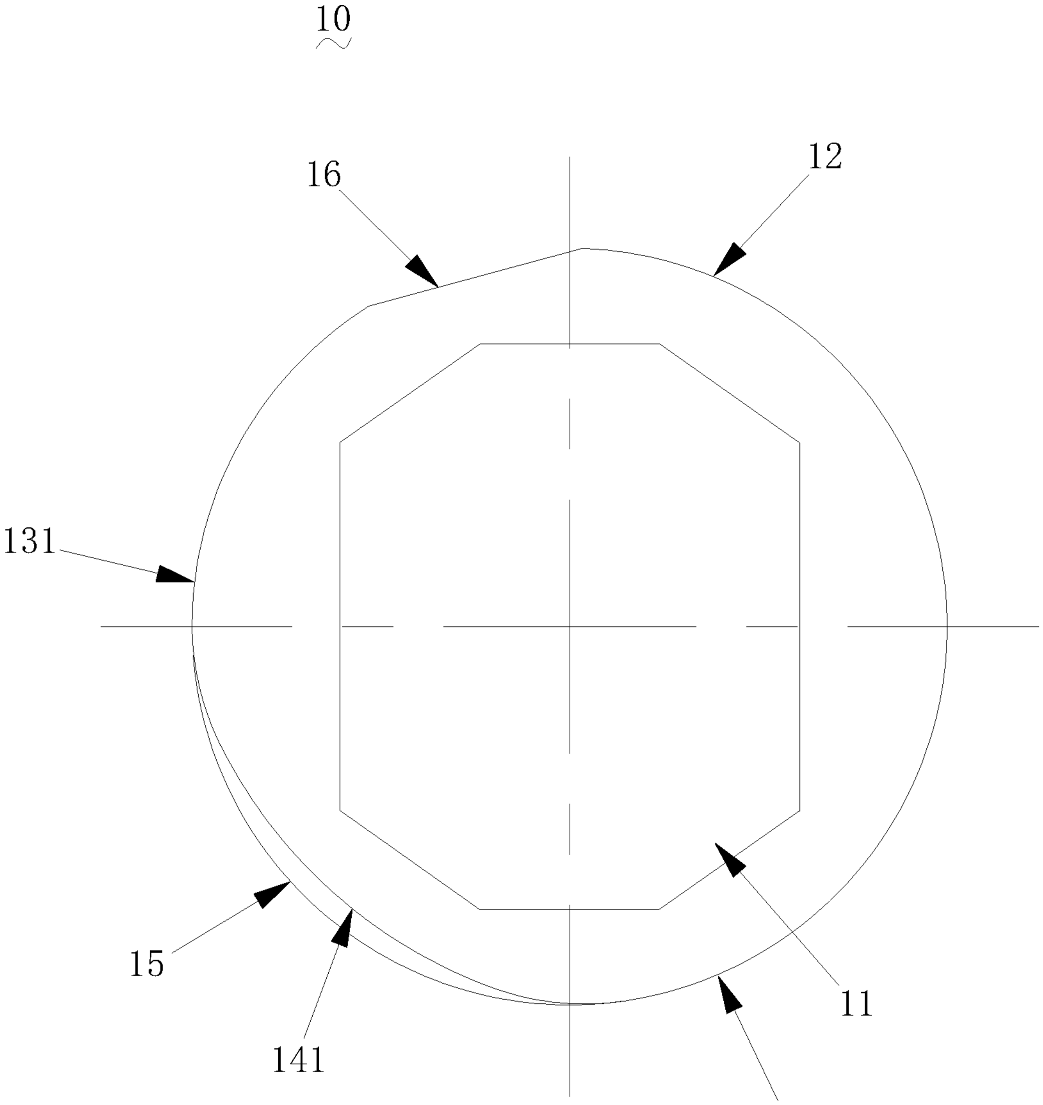
FIG. 5 is a top view of the eccentric slider illustrated in FIG. 4.

As illustrated in FIG. 4 and FIG. 5, a stop edge 15 configured to avoid leakage of the oil is disposed on the hollow side surface 141 and fixedly connected to an end of the hollow side surface 141 facing away from the orbiting scroll 30. An arc side wall of the stop edge 15 is in substantial contact with the corresponding side wall of the orbiting scroll 30. In this way, when the oil is stored at the hollow side surface 141, the oil flows downwards under an effect of gravity, but the stop edge 15 can prevent the oil from leaking downwards at the hollow side surface 141 to enable the oil to stay at the hollow side surface 141 for a longer period of time. That is, the thickness of the oil film formed on the hollow side surface 141 is reduced, i.e., the shear force of the oil film is reduced. In the embodiment, a thickness of the stop edge 15 in an axial direction of the slider body 10 is greater than or equal to 2 mm.

Figure 6:
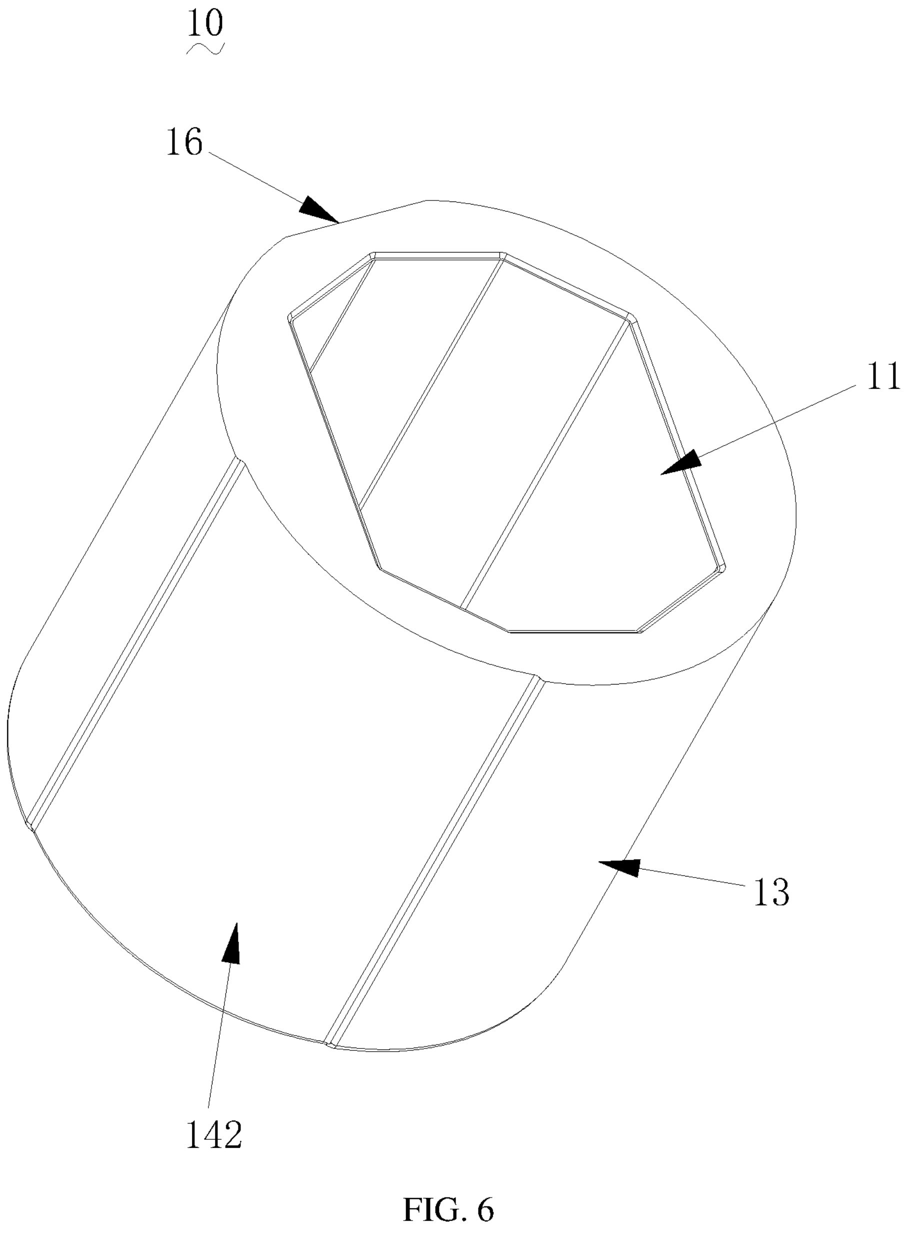
FIG. 6 is a schematic structural view of another embodiment of an eccentric slider of the present disclosure.
Figure 7:
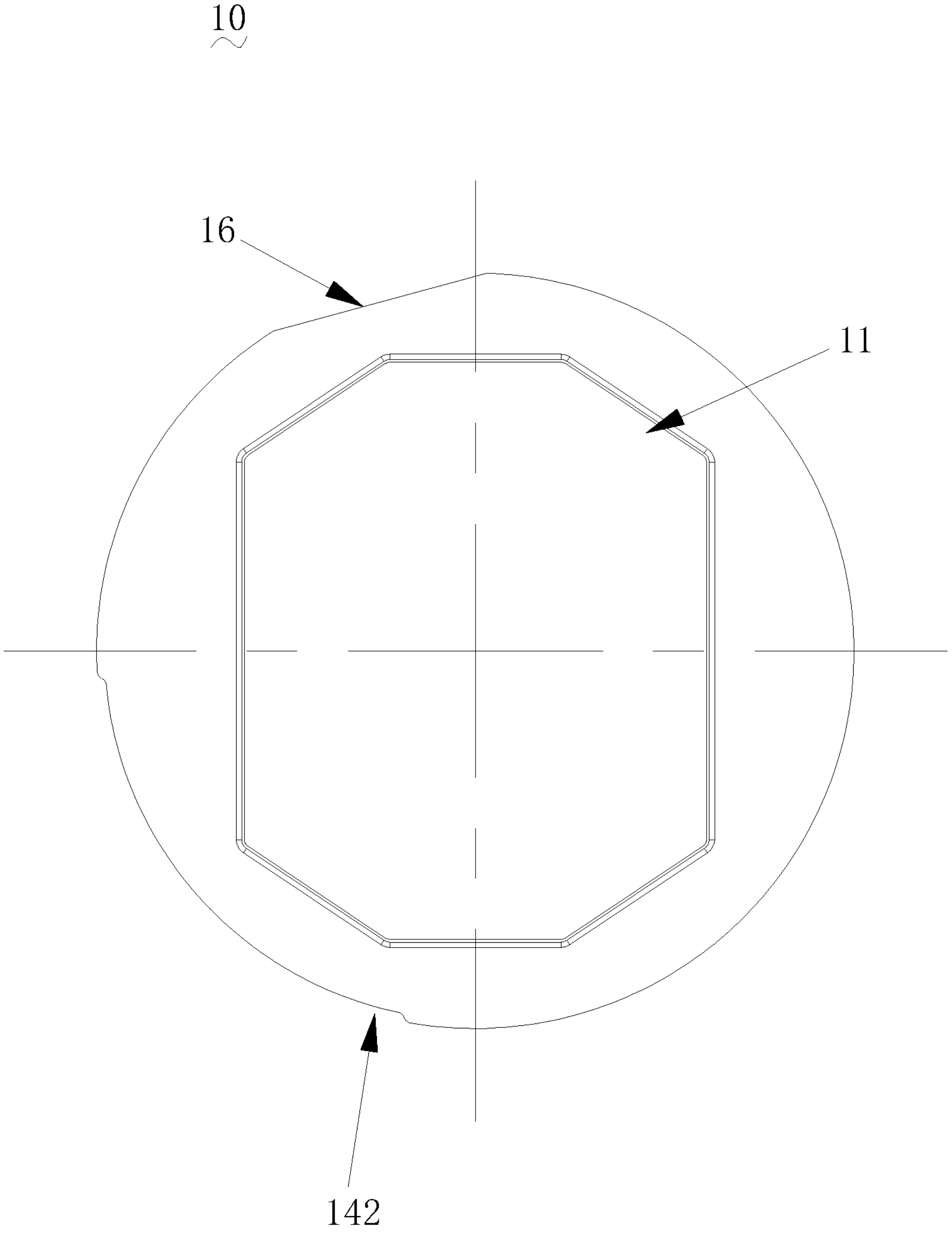
FIG. 7 is a top view of the eccentric slider illustrated in FIG. 6.

As illustrated in FIG. 6 and FIG. 7, in the eccentric slider provided in another embodiment, the hollow portion 14 is a through groove 142 extending in the axial direction of the slider body 10. That is, both ends of the through groove 142 pass through two end surfaces of the slider body 10, respectively. In some embodiments, the through groove 142 has an arc contour shape when the through groove 142 is cut along a direction perpendicular to the axis of the slider body 10. The through groove 142 may be machined and shaped by a milling machine. In addition, the stop edge 15 configured to avoid the leakage of the oil may be disposed at an end of the through groove 142 facing away from the orbiting scroll 30. In this way, when the oil is stored at the through groove 142, the oil flows downwards under the effect of gravity, but the stop edge 15 can prevent the oil from leaking downwards at the through groove 142 to enable the oil to stay at the hollow side surface 141 for a longer period of time. That is, the thickness of the oil film formed on the hollow side surface 141 is reduced, i.e., the oil film shear force is reduced. In the embodiment, the thickness of the stop edge 15 in the axial direction of the slider body 10 is greater than or equal to 2 mm.

Figure 8:
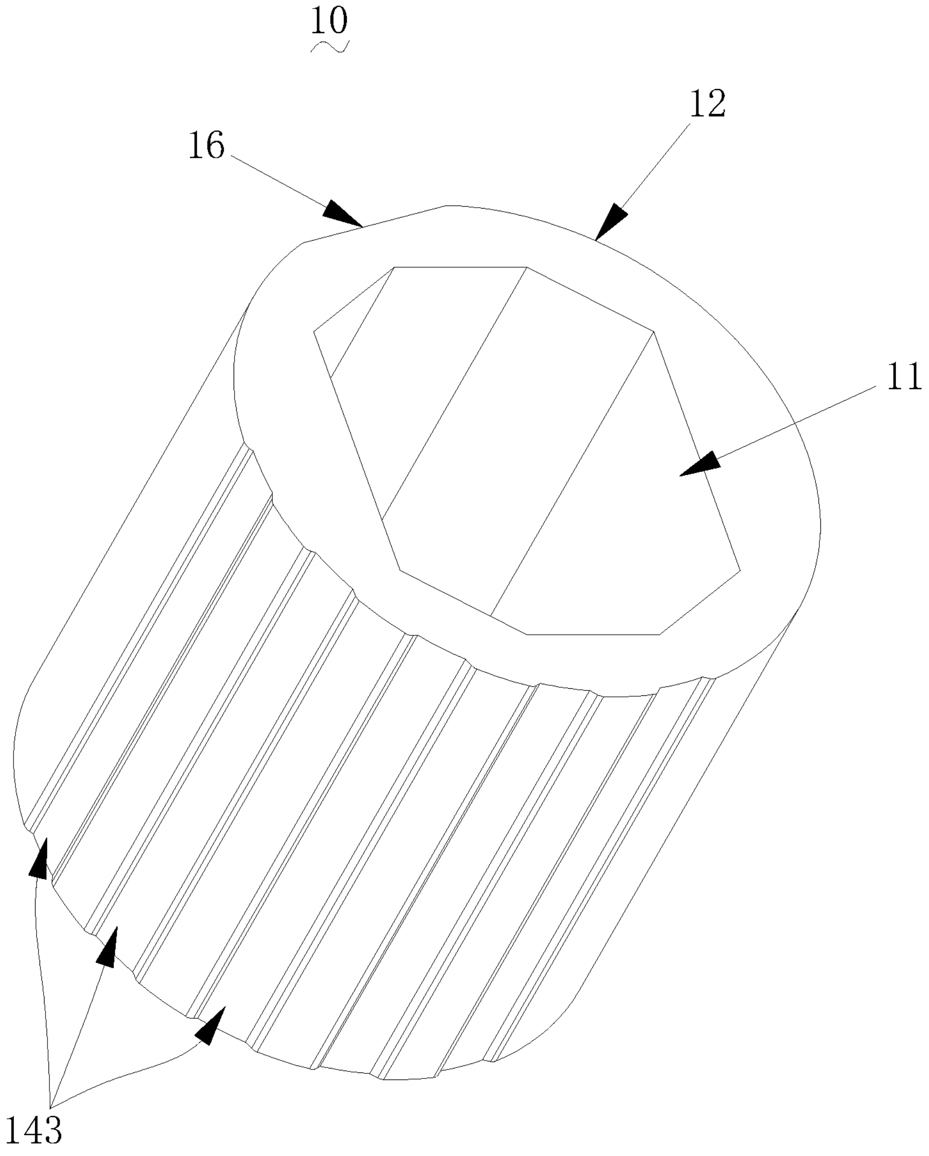
FIG. 8 is a schematic structural view of yet another embodiment of an eccentric slider of the present disclosure.
Figure 9:
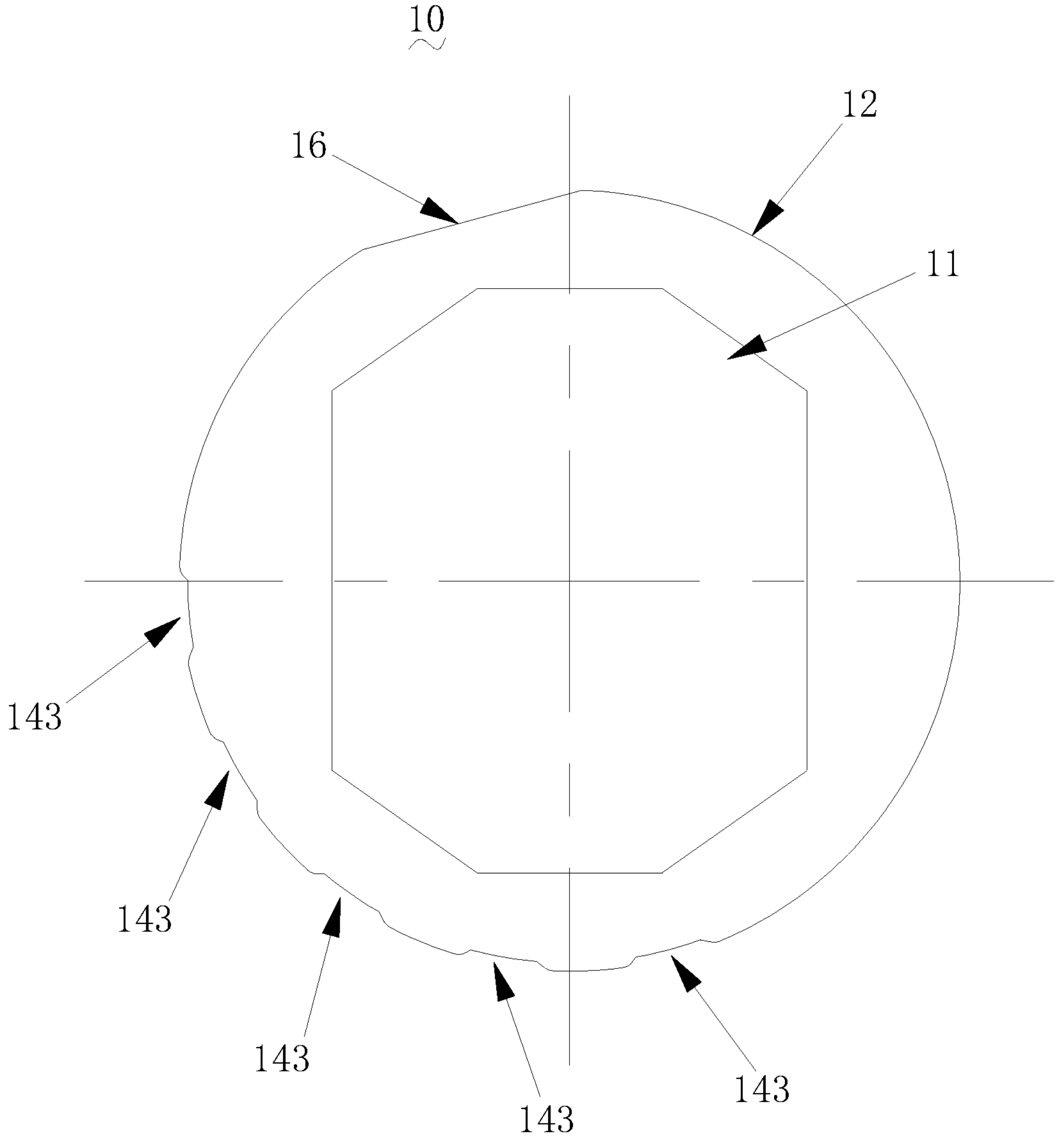
FIG. 9 is a top view of the eccentric slider illustrated in FIG. 8.

As illustrated in FIG. 8 and FIG. 9, in the eccentric slider provided in yet another embodiment, the hollow portion 14 includes a plurality of through grooves 143 extending in an axis direction of the slider body 10. In some embodiments, each through groove 143 is a straight groove parallel to the axis of the slider body 10. Two adjacent through grooves 143 of the plurality of through grooves 143 are spaced apart from each other. In the embodiment, both ends of each through groove 143 pass through two end surfaces of the slider body 10, respectively. The plurality of through grooves 143 is arranged sequentially and forms a sawtooth contour. In addition, the stop edge 15 configured to avoid the leakage of the oil may be disposed at an end of the through groove 143 facing away from the orbiting scroll 30. In this way, when the oil is stored at each through groove 143, the oil flows downwards under the effect of gravity, but the stop edge 15 can prevent the oil from leaking downwards at each through groove 143 to enable the oil to stay at the hollow side surface 141 for a longer period of time. That is, the thickness of the oil film formed on the hollow side surface 141 is reduced, i.e., the oil film shear force is reduced. In the embodiment, the thickness of the stop edge 15 in the axial direction of the slider body 10 is greater than or equal to 2 mm.

Figure 3:
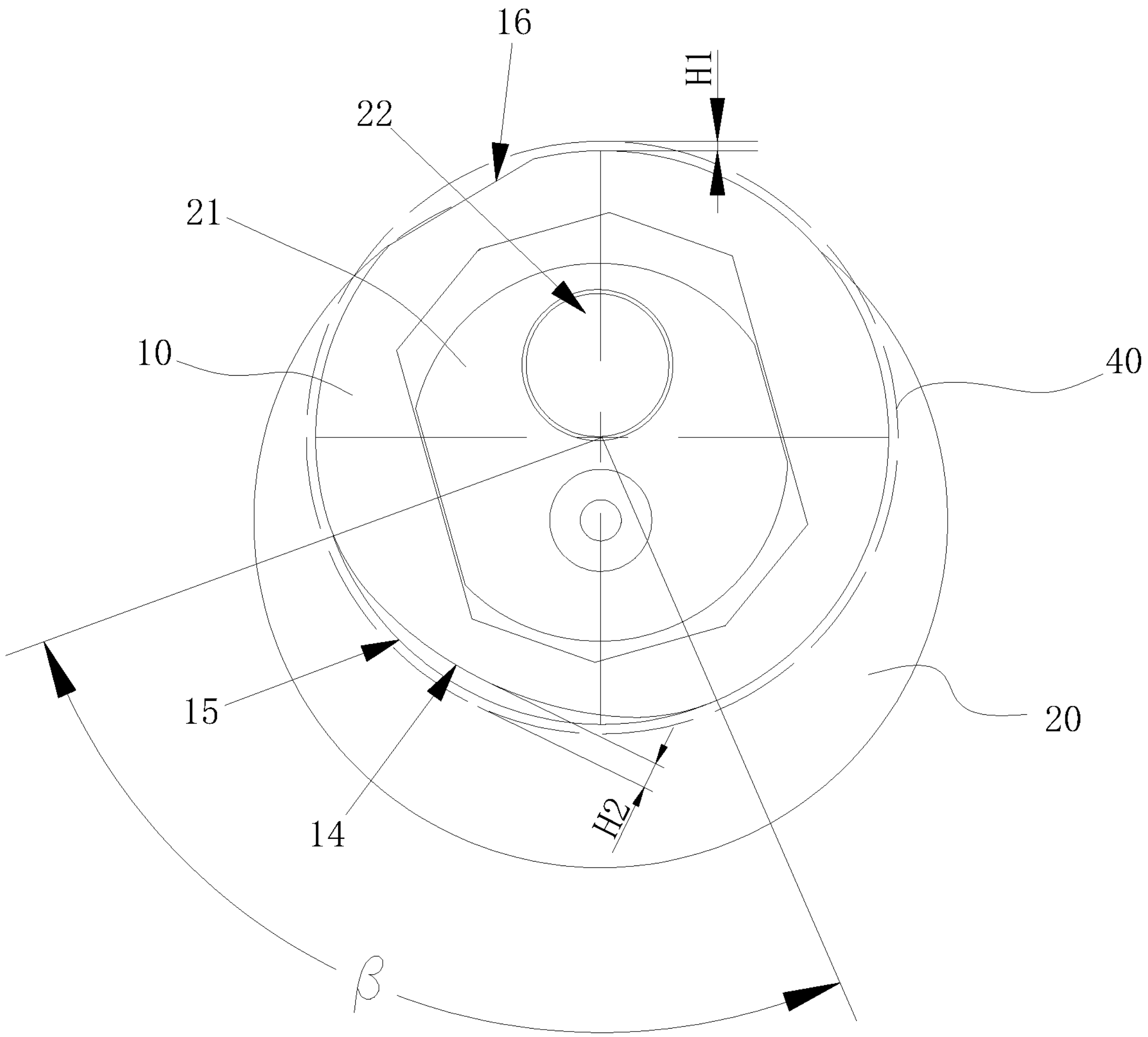
FIG. 3 is a top view of FIG. 2.

As illustrated in FIG. 3, an angle β formed between a plane passing through one of two sides of the hollow portion 14 and the central axis of the slider body 10 and a plane passing through another side of the two sides of the hollow portion 14 and the central axis of the slider body 10 ranges from 60° to 120°. In some embodiments, β ranges from 90° to 100°. In the slider body 10 provided in the embodiments of the present disclosure, β=94°.

As illustrated in FIG. 2 to FIG. 9, in the eccentric slider according to the embodiments of the present disclosure, in a rotation direction of the eccentric shaft segment 21 (in the direction r illustrated in FIG. 2), a flow side surface 16 is disposed in a rear region of the bearing surface 12 and configured to allow for flowing of the oil in an extension direction of the central axis of the slider body 10. In this way, when the oil flows out of a top of the eccentric shaft segment 21 and reaches an axial edge of the slider body 10, the oil enters between the circumferential surface of the slider body 10 and the corresponding side wall of the orbiting scroll 30 (in this case, the oil flows to the hollow portion 14 and the flow side surface 16). Since a passage for flowing of the oil is formed between the flow side surface 16 and the corresponding side surface of the orbiting scroll 30, more oil flows rapidly downwards from the passage. In addition, considering that the flow side surface 16 is adjacent to the bearing surface 12, the oil flowing downwards from the flow side surface 16 can take away frictional heat generated by the oil film at the bearing surface 12 under the shear force of the oil film to effectively cooling, improving the reliability of the scroll compressor.

As illustrated in FIG. 1, the scroll compressor further includes an orbiting scroll bearing 40 fixedly mounted on the mounting portion 31. The slider body 10 is inserted in a bearing bore of the orbiting scroll bearing 40. An outer side wall of the slider body 10 is in a clearance fit with a bore wall of the bearing bore of the orbiting scroll bearing 40, such that the oil flowing out of the top of the eccentric shaft segment 21 can enter a gap between the circumferential surface of the slider body 10 and the bore wall of the bearing bore of the orbiting scroll bearing 40. Generally, the orbiting scroll bearing 40 is made of a material that is self-lubricated. During long-time operation and use of the scroll compressor, inevitably there will be a shortage of oil between the circumferential surface of the slider body 10 and the bore wall of the bearing bore. In this case, the bearing surface 12 of the slider body 10 and the corresponding bore wall of the bearing bore are in direct contact with dry friction. Since the orbiting scroll bearing 40 is self-lubricated, an inner side wall of the mounting portion 31 of the orbiting scroll and the bearing surface 12 of the slider body 10 can be protected through the orbiting scroll bearing 40, to effectively reduce the wear caused by direct friction between the bearing surface 12 and the bore wall of the bearing bore, which improves the performance and the reliability of the scroll compressor.

As illustrated in FIG. 3, a clearance between an outer peripheral wall of the slider body 10 and the bore wall of the bearing bore of the orbiting scroll bearing 40 ranges from 0.1 mm to 0.6 mm. In particular, in the embodiments of the present disclosure, a clearance H1 between the bearing surface 12 and the corresponding bore wall of the orbiting scroll bearing 40 ranges from 0.1 mm to 0.5 mm. In this way, it can be ensured that the oil between the bearing surface 12 and the inner side wall of the mounting portion 31 of the orbiting scroll 30 always forms the oil film for lubrication, which can avoid direct dry friction between the bearing surface 12 and the corresponding bore wall of the bearing bore generated when the oil film shear force generated by the compression between the bearing surface 12 and the corresponding bore wall of the bearing bore completely breaks the oil film.

Further, as illustrated in FIG. 3, a clearance H2 between a wall surface of the hollow portion 14 and a corresponding portion of the bore wall of the bearing bore ranges from 0.2 mm to 0.6 mm. In the present disclosure, the clearance H1 between the bearing surface 12 and the corresponding bore wall of the orbiting scroll bearing 40 is smaller than the clearance H2 between the wall surface of the hollow portion 14 and the corresponding portion of the bore wall of the bearing bore (i.e., H1<H2). In this way, the oil is stored at the hollow portion 14, which effectively reduces a thickness of the oil film formed between the hollow portion 14 and the corresponding portion of the bore wall of the bearing bore. That is, the shear force of the oil film is reduced, which reduces the overall shear force of the oil film between the circumferential surface of the eccentric slider and the corresponding side wall of the orbiting scroll 30, thereby effectively improving the performance and reliability of the scroll compressor.

According to one embodiment of the present disclosure, a temperature control device (not illustrated) is provided. In some embodiments, the temperature control device includes the scroll compressor described earlier in the present disclosure. The scroll compressor is applied to compress a refrigerant of the temperature control device.

While some embodiments of the present disclosure are described above, the present disclosure is not limited to these embodiments. Any modification, equivalent replacement, improvement, or the like made within the spirit and principles of the embodiments of the present disclosure shall fall with the protect scope of the present disclosure.

What is claimed is:

1. An eccentric slider for a crankshaft, the eccentric slider comprising:
- a slider body comprising:
  - a bearing surface configured to drive an orbiting scroll; and
  - at least one non-bearing surface opposite the bearing surface,
- wherein:
  - the slider body forms:
    - an assembly hole configured to allow for an insertion of an eccentric shaft segment of the crankshaft; and
    - a hollow portion on the non-bearing surface configured to accommodate an oil, wherein the hollow portion is a plurality of through grooves extending in an axial direction of the slider body and spaced apart from each other; and
  - an angle formed between a plane passing through one of two sides of the hollow portion and a central axis of the slider body and a plane passing through another side of the two sides of the hollow portion and the central axis of the slider body ranges from 60° to 120°.

2. The eccentric slider according to claim 1, wherein:
- the non-bearing surface comprises a hollow side surface forming the hollow portion; and
- the hollow side surface is closer to a central axis of the slider body than the bearing surface.

3. The eccentric slider according to claim 2, wherein:
- the non-bearing surface further comprises a first transition side surface and a second transition side surface;
- the hollow side surface is disposed between the first transition side surface and the second transition side surface;
- the first transition side surface is disposed between the hollow side surface and the bearing surface;
- the second transition side surface is disposed between the hollow side surface and the bearing surface; and
- the first transition side surface and the second transition side surface are further from the central axis of the slider body than the non-bearing surface and closer than or at a same distance from the central axis of the slider body than the bearing surface.

4. The eccentric slider according to claim 3, wherein the slider body further comprises a flow side surface disposed between the first transition side surface and the bearing surface and configured to allow for flowing of the oil.

5. The eccentric slider according to claim 2, wherein the hollow side surface is convex away from a central axis of the slider body.

6. The eccentric slider according to claim 1, wherein the hollow portion is a through groove extending in an axial direction of the slider body.

7. The eccentric slider according to claim 1, wherein the slider body further comprises a stop edge forming an end of the hollow portion facing away from the orbiting scroll.

8. The eccentric slider according to claim 1, wherein the slider body further comprises a flow side surface disposed between the non-bearing surface and the bearing surface and configured to allow for flowing of the oil.

9. The eccentric slider according to claim 8, wherein the flow side surface is closer to a central axis of the slider body than the bearing surface.

10. The eccentric slider according to claim 8, wherein the flow side surface is planar.

11. A scroll compressor comprising:
- a crankshaft comprising:
  - an eccentric shaft segment forming an oil passage that penetrates the eccentric shaft segment and extends in an axial direction of the crankshaft;
  - an orbiting scroll forming a mounting portion; and
  - an eccentric slider mounted between the eccentric shaft segment of the crankshaft and the mounting portion of the orbiting scroll, the eccentric slider comprising:
    - a slider body comprising:
      - a bearing surface configured to drive the orbiting scroll; and
      - at least one non-bearing surface opposite the bearing surface,
- wherein:
  - the slider body forms:
    - an assembly hole interfacing with the eccentric shaft segment of the crankshaft; and
    - a hollow portion on the non-bearing surface configured to accommodate an oil, wherein the hollow portion is a plurality of through grooves extending in an axial direction of the slider body and spaced apart from each other; and
  - an angle formed between a plane passing through one of two sides of the hollow portion and a central axis of the slider body and a plane passing through another side of the two sides of the hollow portion and the central axis of the slider body ranges from 60° to 120°.

12. The scroll compressor according to claim 11, further comprising an orbiting scroll bearing fixedly mounted in the mounting portion of the orbiting scroll, wherein:

the slider body of the eccentric slider is inserted in a bearing bore of the orbiting scroll bearing; and an outer peripheral wall of the slider body is in a clearance fit with a bore wall of the bearing bore of the orbiting scroll bearing.

13. The scroll compressor according to claim 12, wherein a clearance between the bearing surface of the eccentric slider and the bearing bore of the orbiting scroll bearing ranges from 0.1 mm to 0.6 mm.

14. The scroll compressor according to claim 13, wherein a clearance between a wall surface of the hollow portion and a corresponding portion of the bore wall of the bearing bore of the orbiting scroll bearing ranges from 0.2 mm to 0.6 mm.

15. An eccentric slider for a crankshaft, the eccentric slider comprising:

a slider body comprising:

a bearing surface configured to drive an orbiting scroll; and at least one non-bearing surface disposed opposite the bearing surface and comprising a hollow side surface, wherein:

the slider body forms an assembly hole configured to allow for an insertion of an eccentric shaft segment of the crankshaft;

the non-bearing surface forms a hollow portion configured to accommodate an oil, wherein the hollow portion is a plurality of through grooves extending in an axial direction of the slider body and spaced apart from each other; and the hollow side surface is convex away from a central axis of the slider body.

* * * * *